UNITED STATES PATENT OFFICE.

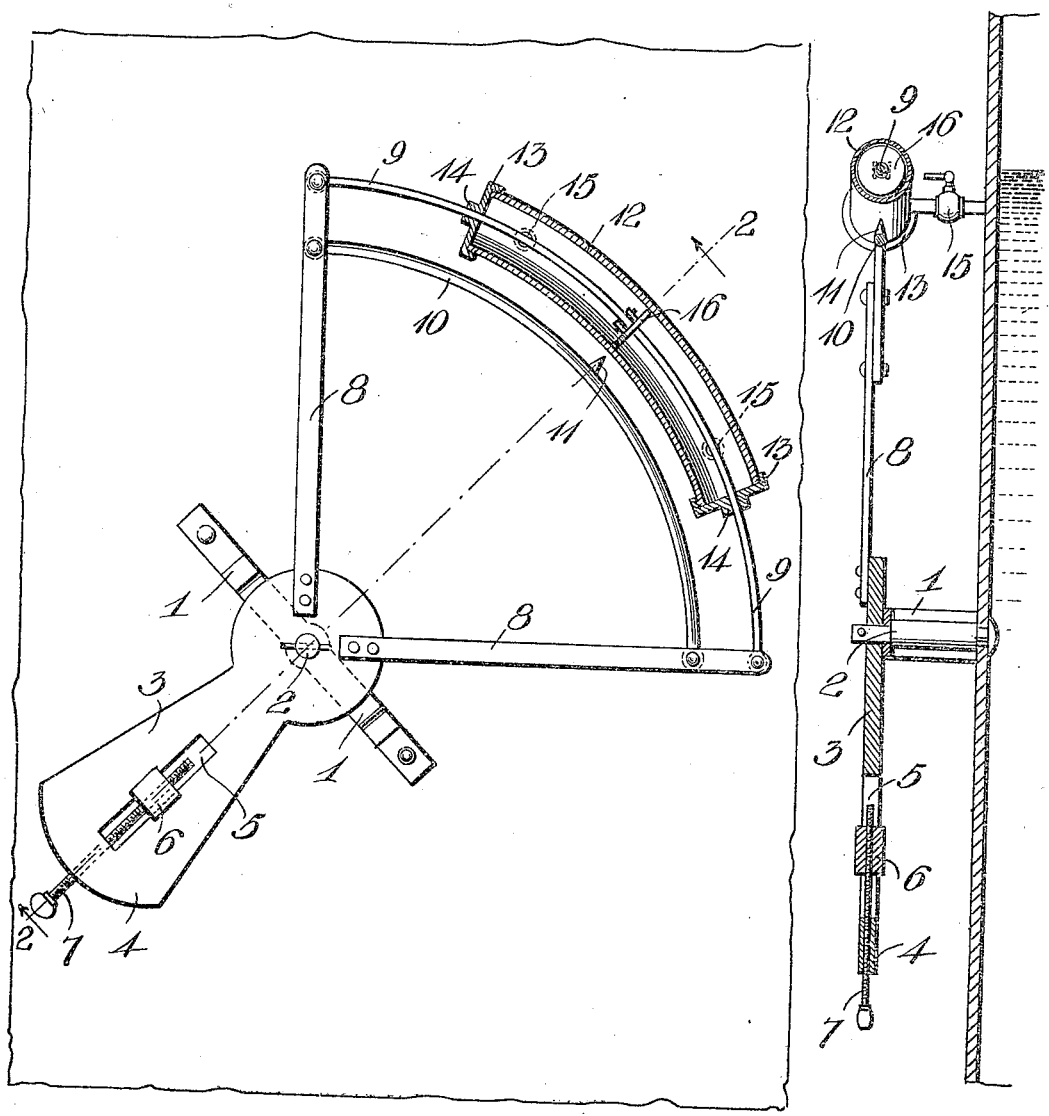

FRANK BAKER, OF DALTON, NEW YORK.

WATER-GAGE.

958,072.  Specification of Letters Patent.  Patented May 17, 1910.

Application filed June 11, 1909. Serial No. 501,530.

*To all whom it may concern:*

Be it known that I, FRANK BAKER, a citizen of the United States, residing at Dalton, in the county of Livingston and State of New York, have invented certain new and useful Improvements in Water-Gages; and I do declare the following to be a full, clear, and exact description of the invention, such as will enable others skilled in the art to which it appertains to make and use the same.

This invention relates to improvements in water gages.

The object of the invention is to provide a water gage constructed entirely of metal to take the place of the usual glass gages and which will accurately indicate the level of the water in a boiler.

With the foregoing and other objects in view, the invention consists of certain novel features of construction, combination and arrangement of parts, as will be more fully described and particularly pointed out in the appended claims.

In the accompanying drawings, Figure 1 is a side view of a gage constructed in accordance with the invention, parts being shown in section; Fig. 2 is a sectional view of the same on the line 2—2 of Fig. 1.

In the embodiment of my invention, I provide a suitable supporting frame or spider 1 which is secured to the boiler in any suitable manner. On the frame or spider is arranged a pivot stud 2, on which is pivotally mounted a supporting plate 3 provided on one side with a counter balancing arm 4 in which is formed a slot 5. In the slot 5 is adjustably secured an auxiliary adjusting weight 6 which is adapted to be moved inwardly and outwardly toward and from the pivotal connection of the plate 3 by means of an adjusting screw 7 whereby the length of the moment arm about the axis of arm 4 is regulated.

On the plate 3, opposite to the arm 4, is secured right angularly disposed supporting bars 8, the outer ends of which are connected together by a segmental float carrying rod or bar 9. The supporting bars 8 are also connected together adjacent to their outer ends by a segmental indicating rod or bar 10 on which is arranged an index finger or pointer 11.

The float carrying rod 9 is mounted to slide through a segmental gage tube 12, the opposite ends of which are closed by caps 13 in which are arranged stuffing boxes 14 through which the rod 9 works. The segmental gage tube 12 is formed of suitable metal and is connected at its opposite ends to the boiler by gage cocks 15. On the rod 9 within the tube 12 is arranged a float or piston 16, said float or piston being fixed to the rod 9, by set screws as shown in Fig. 1.

By means of a gage constructed as herein shown and described, the rise and fall of the water in the boiler will operate the float 16 in the gage tube and will move the float carrying rod in one direction or the other, thus turning the plate 3 on the frame 1 through the supporting bars 8. The indicating pointer 11 is secured to the rod 10 opposite to the point where the float 16 is secured to the rod 9 and as the float is moved back and forth in the tube, the pointer on the rod 10 will also be moved and will indicate on the tube the position of the float within the same, so that the level of the water in the boiler will be accurately indicated. The counter balancing arm 4 and weight 6 are provided to accurately adjust the parts with respect to the pressure in the boiler. By providing the metal gage tube 12, the danger of the same bursting is obviated, while the water level in the boiler is just as accurately indicated as when a glass gage tube is employed.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a water gage, a pivotally mounted supporting plate, a rod, means connecting said rod to said plate in fixed relation thereto, a float fixed on said rod, a metal gage tube surrounding said float and through which said rod is adapted to slide, means for connecting said tube with a boiler and means connected with said first mentioned means for indicating the position of the float within the tube.

2. In a water gage, a supporting frame, a supporting plate pivotally mounted on said frame, a counter balancing arm arranged on said plate, right angular supporting arms secured to the plate, a segmental float carrying rod secured to the outer ends of said arms, a float secured to said rod, a segmental gage tube to receive said float supporting rod and float, means to connect said tube with a boiler on opposite sides of the float, and means whereby the position of the float in the tube is indicated.

3. In a water gage, a pivotally mounted supporting plate, a counter balancing arm on said plate, an adjustable weight arranged on said arm, a segmental float carrying arm, means connecting said arm to said plate, a float fixed on said arm, a segmental metal gage tube adapted to receive said float carrying arm and float, stuffing boxes arranged on the opposite ends of said tube to provide a fluid tight engagement with said float carrying rod, means to connect the tube with a boiler, a segmental pointer carrying rod, mounted on the connecting means of said float carrying arm, and an indicating pointer carried by said rod to indicate the position of the float in the tube.

In testimony whereof I have hereunto set my hand in presence of two subscribing witnesses.

FRANK BAKER.

Witnesses:
EARL A. ALLEN,
ALFRED TABER.